United States Patent
Kamp et al.

(10) Patent No.: US 11,293,849 B2
(45) Date of Patent: Apr. 5, 2022

(54) METHOD FOR OPERATING A SENSOR FOR DETECTING PARTICLES IN A MEASURING GAS

(71) Applicant: Robert Bosch GmbH, Stuttgart (DE)

(72) Inventors: Bernhard Kamp, Tamm (DE); Christian Schulhauser, Munich (DE); Gerd Hartmann, Weingarten (DE); Markus Eitel, Farmington Hills, MI (US); Steve Kautzschmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 16/766,588

(22) PCT Filed: Nov. 26, 2018

(86) PCT No.: PCT/EP2018/082573
§ 371 (c)(1),
(2) Date: May 22, 2020

(87) PCT Pub. No.: WO2019/110354
PCT Pub. Date: Jun. 13, 2019

(65) Prior Publication Data
US 2021/0025804 A1   Jan. 28, 2021

(30) Foreign Application Priority Data

Dec. 6, 2017   (DE) .......................... 102017222032.5
Apr. 12, 2018   (DE) .......................... 102018205595.5

(51) Int. Cl.
*G01N 15/06*   (2006.01)
*F01N 13/00*   (2010.01)
*G01N 15/00*   (2006.01)

(52) U.S. Cl.
CPC ....... *G01N 15/0606* (2013.01); *F01N 13/008* (2013.01); *G01N 15/0656* (2013.01);
(Continued)

(58) Field of Classification Search
CPC ........... G01N 15/0606; G01N 15/0656; G01N 2015/0046; G01N 1/2252; F01N 13/008;
(Continued)

(56) References Cited

U.S. PATENT DOCUMENTS

2011/0314899 A1\* 12/2011 Di Miro ............... F02D 41/1466
73/23.33
2016/0223432 A1\* 8/2016 Kubinski ........... G01N 15/0656
(Continued)

FOREIGN PATENT DOCUMENTS

DE   102015214398 A1   2/2017
DE   102017111507 A1   11/2017

OTHER PUBLICATIONS

International Search Report for PCT/EP2018/082573, dated Mar. 15, 2019.

*Primary Examiner* — David Z Huang
(74) *Attorney, Agent, or Firm* — Norton Rose Fulbright US LLP; Gerard Messina

(57) ABSTRACT

A method for operating a sensor for detecting particles in a measuring gas. The sensor includes a sensor element including a substrate, and at least one first electrode and at least one second electrode situated on the substrate. The first electrode and the second electrode carry out a current and/or voltage measurement in temporally spaced measuring phases, at least during an interruption of a measuring phase a check being carried out as to whether the interrupted measuring phase is continuable, the interrupted measuring phase being identified as continuable, and the sensor being subsequently switched off, if, after an expected trigger time,
(Continued)

a value for a current and/or voltage measurement falls below a threshold value, a regeneration of the sensor element for removing particles from the sensor element being carried out, and the sensor being subsequently switched off, if the value for the current and/or voltage measurement exceeds the threshold value.

14 Claims, 3 Drawing Sheets

(52) U.S. Cl.
CPC .. *F01N 2560/05* (2013.01); *F01N 2900/1606* (2013.01); *G01N 2015/0046* (2013.01)

(58) Field of Classification Search
CPC ......... F01N 2560/05; F01N 2900/1606; F01N 13/08
See application file for complete search history.

(56) References Cited

U.S. PATENT DOCUMENTS

2016/0320285 A1* 11/2016 Weber ................... F01N 3/0885
2017/0342923 A1    11/2017 Zhang

* cited by examiner

METHOD FOR OPERATING A SENSOR FOR DETECTING PARTICLES IN A MEASURING GAS

BACKGROUND INFORMATION

Numerous methods and devices for detecting particles, such as soot or dust particles, are available in the related art.

Without limiting further embodiments and applications, the present invention is described hereafter, in particular, with reference to sensors for detecting particles, in particular, soot particles, in an exhaust gas flow of an internal combustion engine.

It is conventional in practice to measure a concentration of particles, such as soot or dust particles, in an exhaust gas with the aid of two electrodes, which are situated on a ceramic. This may take place, for example, by a measurement of the electrical resistance of the ceramic material separating the two electrodes. More precisely, the electric current which flows between the electrodes when a voltage is applied thereto is measured. Due to electrostatic forces, the soot particles accumulate between the electrodes and, over time, form electrically conductive bridges between the electrodes. The more of these bridges are present, the more the measured current rises. Thus, an increasing short circuit of the electrodes forms. The sensor element is periodically regenerated by being brought to at least 700° C. by an integrated heating element, whereby the soot accumulations burn off.

Such sensors are used, for example, in an exhaust tract of an internal combustion engine, such as a combustion engine of the diesel type. These sensors are usually situated downstream from the exhaust valve or the soot particulate filter.

Despite the numerous advantages of the conventional devices for detecting particles, these still have improvement potential. The conventional sensors, for example, are based on a cyclical measuring principle. The sensor measuring cycle begins every time the ignition is switched on after the dew point release of the sensor with a regeneration of the sensor element. The soot accumulated on the electrodes of the particle sensor is burned off in the process by thermal heating to a defined ceramic temperature. During the subsequent thermalization phase, a thermal equilibrium arises between the ceramic sensor element and the exhaust gas. During a shortfall of a temperature threshold value at the sensor element, the measuring phase takes place by the request of the on-board diagnosis measuring cycle and application of a measuring voltage to the sensor element. In the case of a defective particulate filter, soot accumulates on the sensor element. As a result of the soot accumulation, the sensor current may measurably increase and, starting at a particular current threshold, transitions into a linear increase, so that a defective particulate filter according to on-board diagnosis laws may be identified. The sensor current has to be greater than the current threshold after a predicted trigger time. After completion of the sensor measuring phase, a new sensor measuring cycle takes place with the start of a renewed sensor regeneration. During the measuring phase, care must be taken that the sensor temperature does not fall below the condensate threshold temperature so that the sensor current does not rise so drastically as a result of condensate that a "good DPF" is erroneously identified as defective (FALSE FAIL). Using the present operating strategy of the conventional sensors, it is only possible to supply a particulate filter diagnosis result within a driving cycle. Accordingly, the driving cycle has to be sufficiently long to reach the dew point end, regenerate the sensor, and supply sufficient soot during the measuring phase for triggering the sensor or for delivering a diagnosis result. The sensor must be continuously supplied with power during the entire measuring cycle.

SUMMARY

In accordance with the present invention, an example method is provided for operating a sensor for detecting particles, in particular, soot particles, which at least largely avoids the disadvantages of conventional operating methods, and which allows the operating strategy of the sensor to be adapted to increase the so-called in-use monitoring performance ratio of the particulate filter diagnosis and to improve the demonstrability during the on-board diagnosis certification. In particular, the example method is to make it possible to be able to divide the sensor measuring cycle among multiple driving cycles. The sensor is to be switched off in the process between the driving cycles.

In an example method according to the present invention for operating a sensor for detecting particles in a measuring gas, in particular, soot particles, the sensor including a sensor element, the sensor element including a substrate, at least one first electrode and at least one second electrode, the first electrode and the second electrode being situated on the substrate, the first electrode and the second electrode carrying out a current and/or voltage measurement in temporally spaced measuring phases. During at least one interruption of a measuring phase, a check is carried out as to whether the interrupted measuring phase is continuable. The interrupted measuring phase is identified as continuable, and the sensor is subsequently switched off if, after an expected trigger time, a value for a current and/or voltage measurement falls below a threshold value. A regeneration of the sensor element for removing particles from the sensor element is carried out, and the sensor is subsequently switched off, if the value for the current and/or voltage measurement exceeds the threshold value.

In particular, the measuring phase is identified as continuable if criteria which enable a continuation of the measurement are met. In a new driving cycle, a sensor regeneration is then dispensed with. A further option of the method is to regenerate the sensor element at the end of a driving cycle after the ignition or the internal combustion engine has been switched off. In the next driving cycle, it is then possible to switch directly into the measuring phase of the sensor, without regeneration of the sensor element.

For example, upon a completion of the driving cycle, a check is carried out as to whether the interrupted measuring phase is continuable. The measuring phase is identified as continuable, and the sensor is subsequently switched off, if a value for a current and/or voltage measurement falls below a threshold value or a ratio of a predicted trigger time of a sensor diagnostic function is within a predefined range.

Accordingly, the method allows the measuring phase to be divided among multiple operating cycles of the sensor, provided that certain prerequisites are met. In this way, measuring results may be ascertained sooner or more frequently. A short circuit of the sensor, for example, represents an exceedance of the threshold value.

In the case of a continuation, the measuring gas is an exhaust gas of an internal combustion engine. The measuring phase identified as continuable is continued if predetermined check criteria are met upon switch-on of the internal combustion engine, and a regeneration of the sensor element for removing particles from the sensor element is carried out if at least one of the predetermined check criteria is not met upon switch-on of the internal combustion engine.

For example the measuring gas is an exhaust gas of an internal combustion engine. The measuring phase identified as continuable is continued if predetermined check criteria are met upon switching on the internal combustion engine, and a switch is made directly into the measuring phase, without carrying out a regeneration of the sensor element for removing particles from the sensor element, if predetermined check criteria are met upon switching on the internal combustion engine. If at least one check criterion is not met, a regeneration of the sensor element for removing particles from the sensor element is carried out.

Accordingly, it is checked, prior to a (renewed) operation of the sensor, whether or not it is ready for a continuation of the preceding measuring phase. In this way, measuring results may be ascertained sooner or more frequently when the check criteria are met.

In the case of a continuation, a measuring phase is started after the regeneration and upon switching on the internal combustion engine if predetermined check criteria are met. In this way, measuring results may be ascertained sooner or more frequently when the check criteria are met.

In the case of a continuation, a measuring phase is started after a regeneration in the overrun and upon renewed switching on of the internal combustion engine if predetermined check criteria are met. In this way, measuring results may be ascertained sooner or more frequently when the check criteria are met.

In the case of a continuation, the predetermined check criteria include at least an exceedance of a dew point of the measuring gas, a shortfall of a predetermined time period between switch-off and subsequently switch-on of the internal combustion engine, and an exceedance of a predetermined temperature of the sensor element or further temperatures of the exhaust gas system or the ambient temperature. In this way, important criteria for the check are taken into consideration.

In the case of a continuation, the sensor element is heated if a predetermined temperature of the sensor element falls short. In this way, a distortion of the result by condensate is prevented.

In the case of a continuation, the sensor element is heated upon a shortfall of the predetermined temperature of the sensor element if a value for a current and/or voltage measurement exceeds the threshold value after a predetermined debounce time. In this way, it is checked whether or not the measurement is distorted by condensate.

In the case of a continuation, the sensor element is heated if a dew point of the measuring gas falls short. In this way, a distortion of the result by condensate is prevented.

In the case of a continuation, the sensor element is heated upon a shortfall of the dew point of the measuring gas if a value for a current and/or voltage measurement exceeds the threshold value after a predetermined debounce time. In this way, it is checked whether or not the measurement is distorted by condensate.

In the case of a continuation, the sensor element is heated until a predetermined maximum duration has been reached, the measuring phase being aborted if the maximum duration is reached. In this way, a defective particulate filter, which results in a heavy soot accumulation, may be inferred.

In the case of a continuation, the measuring phase is continued if a value for a current and/or voltage measurement falls below the threshold value after the predetermined debounce time. In this way, a defect at a particulate filter is precluded.

In the case of a continuation, the check criteria furthermore include a shortfall of a predetermined switch-off time of the internal combustion engine, a shortfall of a predetermined accumulated switch-off time of the internal combustion engine and/or an exceedance of a temperature threshold value for a temperature of the sensor element and an exhaust gas temperature upon, in particular, renewed switch-on of the internal combustion engine.

Furthermore, an example computer program is provided, which is configured to carry out every step of the method according to the present invention.

Furthermore, an example electronic storage medium is provided, on which such a computer program is stored.

Furthermore, an example electronic control unit is provided, which includes such an electronic storage medium.

Within the meaning of the present invention, a particle shall be understood to mean particulate matter, in particular, an electrically conductive particle, such as soot or dust particles.

Within the scope of the present invention, an electrode shall be understood to mean a component which is suitable for a current and/or voltage measurement. Within the scope of the present invention, the information 'first and second electrode' is only used to representationally distinguish the electrodes, but is not intended to indicate a particular order or weighting of these components.

Within the scope of the present invention, a current and/or voltage measurement shall be understood to mean a measurement of an electric current and/or a voltage. The measurement takes place between two electrodes. A particular voltage may be applied to the electrodes in the process, and a current flow between the electrodes may be measured, or an electric current may be applied to the electrodes, and a voltage between the electrodes may be measured. A current and/or voltage measurement may, in particular, be a resistance measurement, it being possible to measure a resistance of a configuration formed by the electrodes and the substrate. For example, a voltage-controlled or voltage-regulated measurement and/or a current-controlled and/or current-regulated measurement may take place. The application of the current and/or of the voltage may take place in the form of a continuous signal and/or also in the form of a pulsed signal. For example, a DC voltage and/or a direct current may be applied, and a current response or a voltage response may be detected. As an alternative, a pulsed voltage and/or a pulsed current may be applied, and a current response or a voltage response may be detected.

Within the scope of the present invention, a substrate shall be understood to mean an object having a plate-shaped, cube-shaped, cuboid or any other geometric design, which includes at least one planar surface and is manufactured from a ceramic material, a metallic material, a semi-conductor material or combinations thereof.

Within the scope of the present invention, interdigital electrodes shall be understood to mean electrodes which are situated in such a way that they engage one another, in particular, engage one another like a comb.

Within the scope of the present invention, an expected or predicted trigger time shall be understood to mean the point in time at which, based on instantaneous values of a current and/or voltage measurement, a threshold value is expected or predicted to be exceeded, requiring a regeneration of the senor element. For example, presently or instantaneously established values of a current and/or voltage measurement show that, with unchanged parameters for an accumulation of particles, the sensor element has to be regenerated after 4 hours, so that the expected or predicted trigger time is 4 hours.

Within the scope of the present invention, a debounce time shall be understood to mean a predefined time period during which a signal has to be present at least at an input of a system for it to be identified and further processed by the system. This is not necessarily the shortest technically possible time. The debounce time may be measured with the aid of a debounce counter, which is started the first time a signal occurs and is incremented at regular intervals as long as the signal is present. Only when a predefined threshold value is exceeded is the signal not interpreted as interference, but is further processed by the system. Debounce times are used to prevent brief interferences from being erroneously identified as a signal.

The present invention expands the existing measuring strategy of the particle sensor for increasing the in-use monitoring performance ratio of the particulate filter diagnosis and for improving the demonstrability during the on-board diagnostic certification. This is achieved by the following measures:

1. Continuation of the measuring phase even when a shortfall of the condensation temperature threshold at the sensor occurs
2. Start of the measuring phase prior to dew point end
3. Conditional measuring across driving cycles with the sensor switched off prior to dew point end
4. Regeneration of the sensor element at the end of the driving cycle in the control unit overrun after the internal combustion engine or the ignition has been switched off. In the next driving cycle, it is then possible to switch directly into the measuring cycle, without regeneration.

A first aspect of the present invention is the continuation of the measuring phase, even if the sensor temperature falls below the condensation temperature threshold for liquid water. It is prevented by the control logic in the process that a "good" particulate filter is identified as defective (FALSE FAIL) by the sensor current due to condensate. After a debounce time of the sensor current, the sensor element is actively heated with the aid of the control logic to suppress these condensation effects. This expansion of the measuring range plays a role, in particular, in hybrid vehicles when the sensor temperature falls during the measuring phase due to long electric driving. The present invention reduces the measurement terminations and increases the number of the measuring results. In this way, the in-use monitoring performance ratio does not fall under unfavorable conditions, such as long engine stop phases and long electric driving. The heating only takes place conditionally if a fall occurs below a predefined sensor element temperature of 60° C. to 100° C., for example. The purpose is the removal of liquid water. The heating takes place not only at the start of the driving cycle, but whenever liquid water may be expected. This expectation occurs when liquid water is expected based on the dew point functionality, or when the temperature of the sensor element falls below a predetermined value of, for example, 60° C. to 100° C. In this way, it is possible to achieve an avoidance of erroneous soot detection due to condensation of liquid water on the sensor during the measuring phase.

A fourth aspect of the present invention is the regeneration of the sensor in the overrun of the control unit. If the driver wants to park his or her vehicle, he or she shuts the ignition off, for example he or she turns the ignition key. The engine control unit then goes into overrun and switches off automatically after a certain time. During this time, a regeneration of the sensor element is to take place with the aid of the present invention. After the regeneration has taken place, the engine control unit may switch off. In the next driving cycle, it is then possible to measure directly since it is not necessary to wait for the dew point for a sensor regeneration. The decision as to whether it is possible to remain in the control unit overrun during the measuring phase or whether regeneration takes place is made based on release conditions. These may be:

has a diagnosis result already been achieved in the present driving cycle?
how long was the sensor already in the present measuring cycle during the measuring phase, and how much longer will it take until a diagnosis result is available?
temperature of the sensor element.

With the present strategy, a sensor regeneration is only started after the dew point end has been reached. Subsequent to the sensor regeneration, the measuring phase of the sensor then starts. A second aspect of the present invention is the change of the sensor measuring strategy by already shifting the start of the measuring phase prior to reaching the dew point end. One advantage as a result of measuring prior to the dew point end, when a sensor regeneration is carried out during the control unit overrun, is that, during the on-board diagnostic certification, the measuring result is achieved sooner, so that a particulate filter on-board diagnosis result is achieved more reliably in the certification cycle. As a result of this measure, the in-use monitoring performance ratio is furthermore improved since, in this way, a measuring result may also be achieved in shorter driving cycles. In this aspect of the present invention, the evaluation or control logic is changed in such a way that the measuring may be carried out prior to the dew point end. Upon a shortfall of the dew point end, the sensor element is heated, taking heating release conditions into consideration, such as warm restart, so that the measuring time prior to the dew point end may be kept short. It has to be prevented by the control logic in the process that measuring prior to the dew point end results in a "good" particulate filter being identified as defective (FALSE FAIL) by the sensor current due to condensate. In this way, a start of the measuring phase prior to the dew point end may be implemented.

A third aspect of the present invention is the division of the sensor measuring cycle into multiple driving cycles in combination with the continued measurement strategy prior to the dew point end in the new driving cycle. In this way, the number of measurement terminations in the case of unfavorable driving profiles, such as delivery traffic with frequent engine shut-off phases, driving profiles with low loads or low soot emissions and accordingly long sensor trigger times, are decreased, so that the in-use monitoring performance ratio may be kept accordingly high. In the case of a continuation of the measuring cycle in the new driving cycle, the following criteria are to be checked to avoid FALSE FAIL identifications:

on-board diagnosis ratio of a predicted trigger time of the sensor diagnostic function is within a predefined range
maximum engine shut-off time since the end of the preceding driving cycle has not been exceeded
accumulated maximum engine shut-off time since the end of the preceding driving cycle has not been exceeded
no shortfall of threshold values for temperatures, such as sensor element temperature or gas temperature values upon the start of the new driving cycle, has occurred.

The sensor is switched off between the driving cycles in the process. In this way, it is possible to implement a measuring across driving cycles.

BRIEF DESCRIPTION OF THE DRAWINGS

Additional optional details and features of the present invention may be derived from the description below of preferred exemplary embodiments, which are schematically shown in the figures.

DETAILED DESCRIPTION OF EXAMPLE EMBODIMENTS

Figure 1:
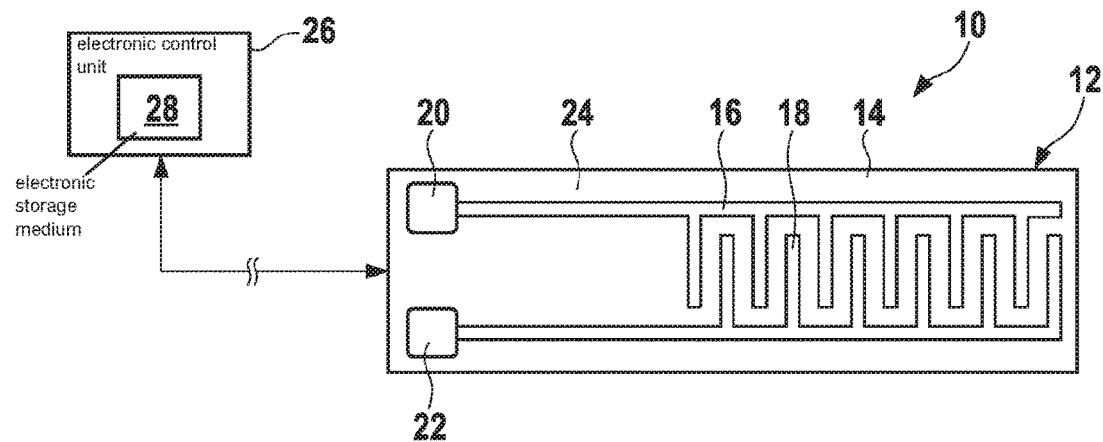
FIG. 1 shows a top view onto a sensor for detecting particles according to one specific embodiment of the present invention.

FIG. 1 shows a top view onto a sensor 10 for detecting particles in a measuring gas according to one specific embodiment of the present invention. Sensor 10 is designed, in particular, for detecting soot particles in a gas stream, such as an exhaust gas stream, of an internal combustion engine and for installation in an exhaust tract of a motor vehicle. Sensor 10 is designed as a soot sensor, for example, and may be situated downstream or upstream from a soot particulate filter of a motor vehicle including a diesel combustion engine. In the shown example, the measuring gas is exhaust gas of an internal combustion engine.

Sensor 10 includes a sensor element 12. Sensor element 12 includes a substrate 14. Substrate 14 is a silicon wafer, for example. As an alternative, substrate 14 is manufactured from a ceramic material. Substrate 14 has an essentially cuboid design. Sensor element 10 furthermore includes a first electrode 16, a second electrode 18, a first feed line 20 and a second feed line 22. First electrode 16, second electrode 18, first feed line 20 and second feed line 22 are situated on an upper side 24 of substrate 14. First electrode 16 and second electrode 18 are designed as interdigital electrodes. First electrode 16 is connected to first feed line 20. Second electrode 18 is connected to second feed line 22. First feed line 20 and second feed line 22 represent connecting contacts, which are designed to electrically contact first electrode 16 and second electrode 18. First electrode 16 and second electrode 18 are designed to carry out a current and/or voltage measurement. Sensor 10 may optionally include further components, such as a protective tube and/or a heating element, which are not shown in greater detail.

Sensor 10 is connected to an electronic control unit 26. Electronic control unit 26 is an engine control unit of the internal combustion engine, for example. The electronic control unit includes an electronic storage medium 28, such as a chip, on which a computer program is stored. The computer program includes instructions for carrying out a method for operating sensor 10. Such a method is described hereafter in greater detail.

Figure 2:
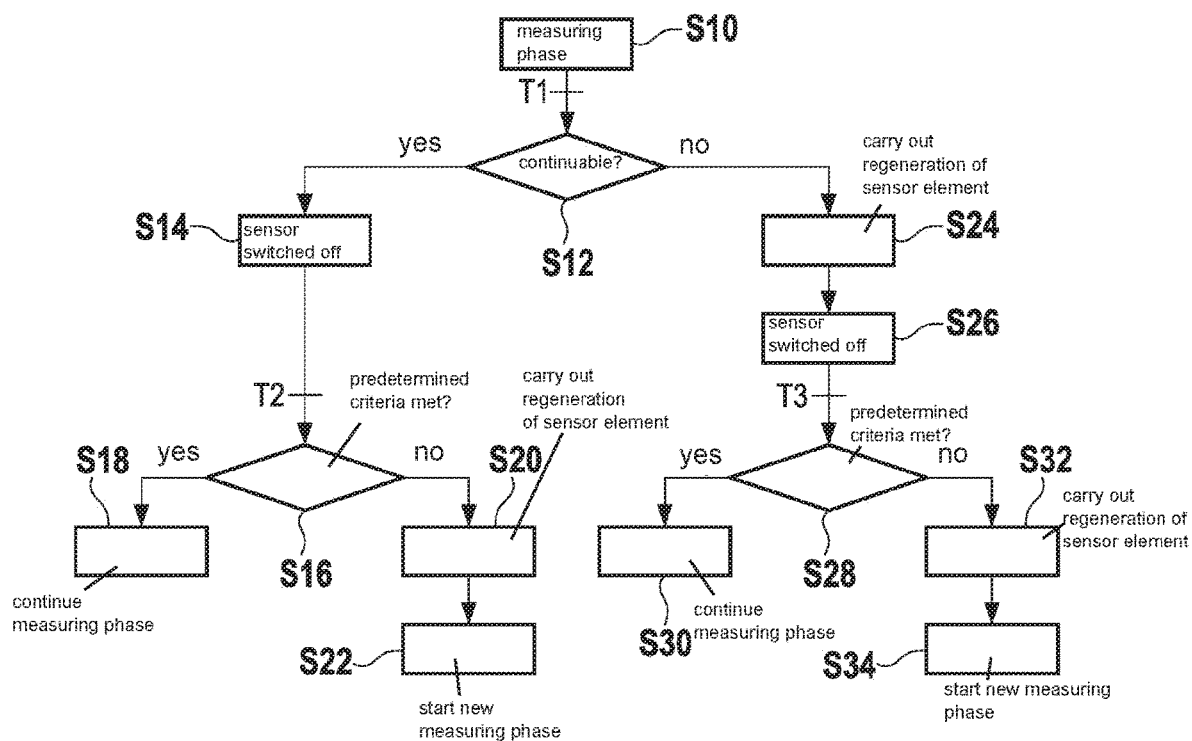
FIG. 2 shows a flow chart of a method for operating a sensor for detecting particles according to one specific embodiment of the present invention.

FIG. 2 shows a flow chart of a method for operating a sensor 10 for detecting particles according to one specific embodiment of the present invention, such as that of sensor 10 shown in FIG. 1. First electrode 16 and second electrode 18 carry out a current and/or voltage measurement in temporally spaced measuring phases. In step S10, for example, a measuring phase is carried out. The measuring phase is interrupted at a point in time T1, for example because the internal combustion engine is being shut off.

During an interruption of a measuring phase, a check is carried out in step S12 as to whether the interrupted measuring phase is continuable. Based on certain criteria, it is decided whether it is useful to continue the interrupted measuring phase in the next operating cycle of the internal combustion engine or driving cycle of the motor vehicle. In step S12, the interrupted measuring phase is identified as continuable if, after an expected trigger time, a value for a current and/or voltage measurement falls below a threshold value. For example, it is checked whether a ratio of the predicted trigger time of a sensor diagnostic function is within a predefined range. In step S14, sensor 10 is switched off.

If the internal combustion engine is started or switched on (again) at a point in time T2, it is checked in step S16 whether predetermined check criteria are met. The predetermined check criteria include at least an exceedance of a dew point of the measuring gas, a shortfall of a predetermined time period between switch-off and subsequently switch-on of sensor 10, and an exceedance of a predetermined temperature of sensor element 12. If all check criteria are met, the measuring phase identified as continuable is continued in step S18. For example, during the start of the next driving cycle, it is checked based on further criteria whether the measuring phase may be continued. Possible check criteria during the start of the next driving cycle are that the dew point end is still present at the sensor installation site, the maximum duration since the end of the preceding driving cycle has not been exceeded, and no shortfall of the minimal temperature of the sensor element has occurred. If all criteria for the continuation are met, sensor 10 goes directly into the measuring phase again. If, upon a switch-on of sensor 10, at least one of the predetermined check criteria is not met, a regeneration of sensor element 12 for removing particles from sensor element 12 is carried out in step S20. Thereafter, a new measuring phase may be started in step S22. If, for example, not all criteria are met, a sensor regeneration has to be started with a subsequent new measuring phase.

If, during the check in step S12, the check criteria are not met in the overrun after the internal combustion engine has been switched off, a regeneration of sensor element 12 for removing particles from sensor element 12 is carried out in step S24. Thereafter, sensor 10 is switched off in step S26. In this way, it is possible during the start of the next driving cycle to dispense with the sensor regeneration, to be able to start the subsequent measuring phase sooner.

If, thereupon, the internal combustion engine is switched on again at a point in time T3, for example since a new driving cycle is being started, it is checked in step S28 whether predetermined check criteria are met. If all check criteria are met, the measuring phase identified as not continuable is continued in step S30 without regeneration. Possible check criteria during the start of the next driving cycle are that the dew point end is still present at the sensor installation site, the maximum duration since the end of the preceding driving cycle has not been exceeded, and no shortfall of the minimal temperature of the sensor element has occurred. If all criteria for the continuation are met, sensor 10 goes into the measuring phase again. If, upon a switch-on of sensor 10, at least one of the predetermined check criteria is not met, a regeneration of sensor element 12 for removing particles from sensor element 12 is carried out again in step S32. Thereafter, a new measuring phase may be started in step S34. If, for example, not all criteria are met, a sensor regeneration has to be started with a subsequent new measuring phase. Upon the start of the next driving cycle, it is checked, for example, whether the measuring phase may be started immediately. If not all criteria are met, a sensor regeneration has to be carried out with a subsequent new measuring phase.

Figure 3:
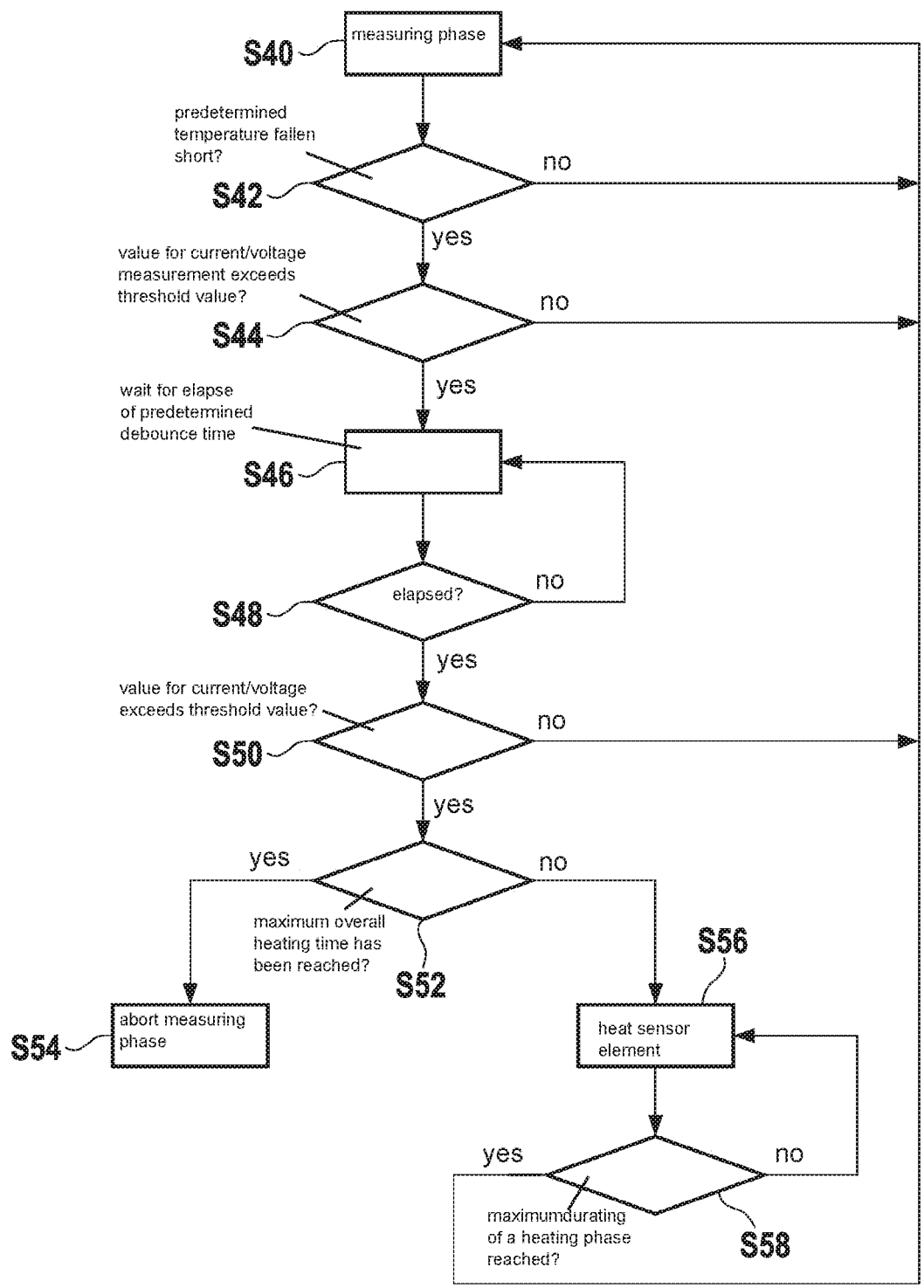
FIG. 3 shows a flow chart of a portion of the method for operating a sensor for detecting particles.

FIG. 3 shows a flow chart of a portion of the method for operating a sensor 10 for detecting particles. FIG. 3 shows, in particular, how a measurement is carried out with the aid of sensor 10 when a shortfall of a condensation temperature threshold value occurs. The sequence shown in FIG. 3 is carried out to avoid FALSE FAIL identifications upon a shortfall of the condensation temperature threshold of sensor 10. First electrode 16 and second electrode 18 carry out a current and/or voltage measurement in temporally spaced measuring phases. In step S40, for example, a measuring phase is carried out. In step S42, it is checked whether a predetermined temperature of sensor element 12 has fallen short. It is checked in step S42, for example, whether a condensation temperature has fallen short. If the predetermined temperature has not fallen short, the method returns to step S40, and the measuring phase is continued. If the predetermined temperature has fallen short, it is checked in step S44 whether a value for a current and/or voltage measurement exceeds the threshold value. For example, it is checked in step S44 whether a condensate stream I is greater than a maximum permitted stream Imax. If this is not the case, the method returns to step S40, and the measuring phase is continued. If the value for a current and/or voltage measurement exceeds the threshold value, for example if condensate stream I is greater than a maximum permitted stream Imax, a predetermined debounce time is awaited in step S46. The debouncing is carried out until it is detected in step S48 that the predetermined debounce time has elapsed. If the predetermined debounce time is exceeded, it is checked in step S50 whether a value for a current and/or voltage measurement exceeds the threshold value. For example, it is checked in step S50 whether a condensate stream I is greater than a maximum permitted stream Imax. If this is not the case, the method returns to step S40, and the measuring phase is continued. If the value for a current and/or voltage measurement exceeds the threshold value, for example if condensate stream I is greater than a maximum permitted stream Imax, sensor element 12 is heated after the predetermined debounce time upon a shortfall of the predetermined temperature of sensor element 12. In step S52, it is checked whether a maximum overall heating time has already been reached or not. If it is established in step S52 that a maximum duration for the heating has already been reached, the measuring phase is aborted in step S54. If the maximum overall heating time has not been reached, sensor element 12 is heated in step S56 above the predetermined temperature, such as the condensation temperature. In step S58, it is checked whether or not the maximum duration of a heating phase has been reached. If the maximum duration of a heating phase has not been reached, the method returns to step S56, and sensor element 12 is further heated. If the maximum duration of a heating phase has been reached in step S58, the method returns to step S40, and the measuring phase is continued. In summary, a debounce time is started when a high sensor current occurs at a temperature below the condensation temperature threshold. The sensor current is monitored during this debounce time. If it drops back to a normal level, the measuring phase is continued. However, if the high current level remains present beyond the debounce time, sensor element 12 is heated to above the condensation temperature threshold. After a minimum heating time, the heating of sensor element 12 is ended, and measuring continues without heating. If the heating time thus carried out overall exceeds a limit, the measuring phase of sensor 10 is aborted. During the further course of the driving cycle, a new measuring phase including a sensor regeneration may then be prepared if a dew point end is present.

Figure 4:
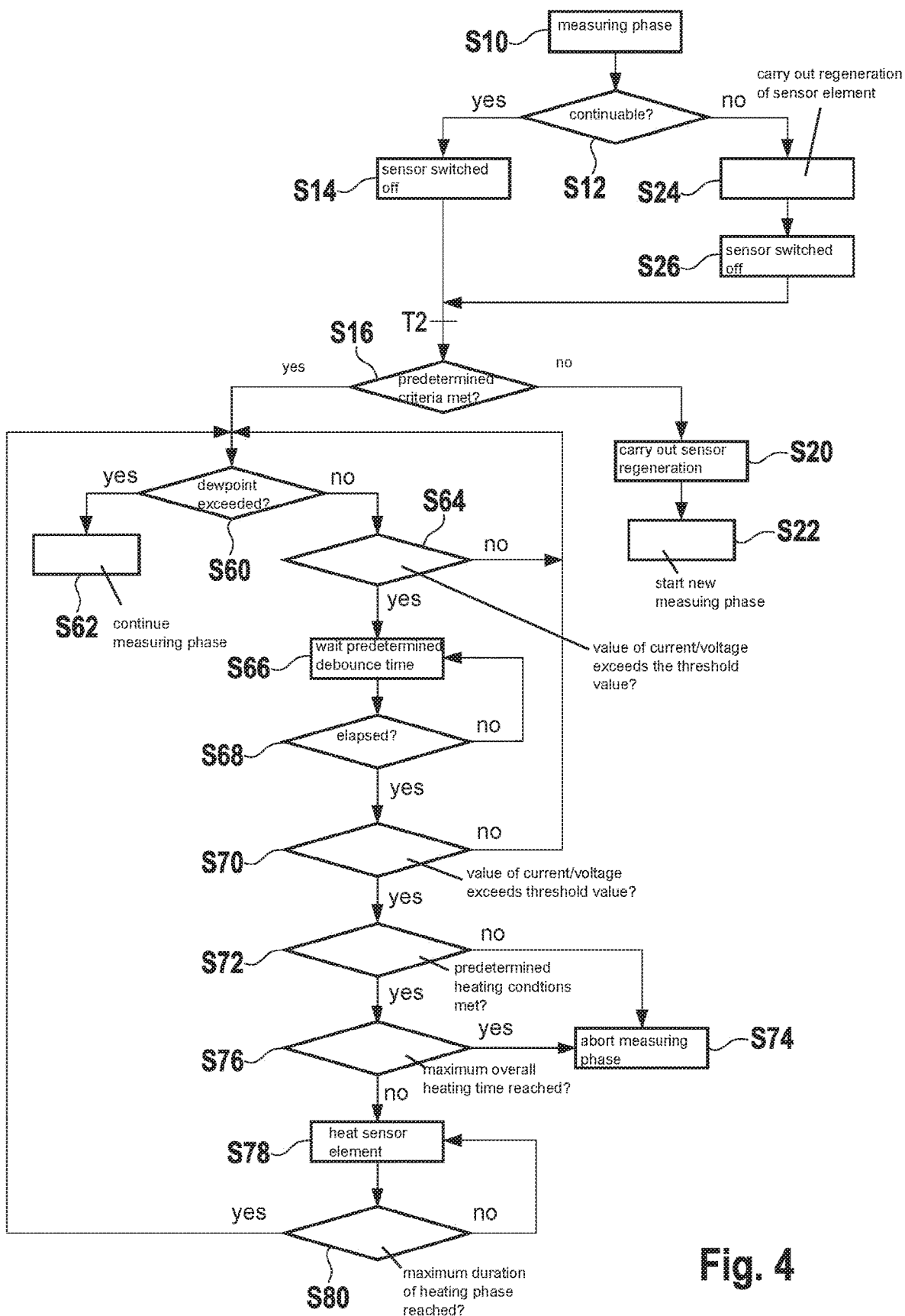
FIG. 4 shows a flow chart of a further portion of the method for operating a sensor for detecting particles.

FIG. 4 shows a flow chart of a further portion of the method for operating a sensor 10 for detecting particles. FIG. 4 shows, in particular, how measuring is carried out with the aid of sensor 10 prior to the dew point end with sensor regeneration in the overrun (step S24), and a conditional measuring across driving cycles prior to the dew point end. The sequence shown in FIG. 4 is carried out directly after the ignition has been switched on again to avoid FALSE FAIL identifications with a measuring start prior to dew point end, when a sensor regeneration was carried out in the control unit overrun. As was already explained in FIG. 2, FIG. 4 starts the method at step S10 with a measuring phase. Steps S12, S14, S16, S20 and S22 are also identical in the sequence of FIG. 4, so that these are not described again, but instead reference is made to the description regarding FIG. 2. However, it is mentioned that, in step S20, the sensor regeneration is carried out if check criteria and the dew point end are not present. The method is thus described subsequent to step S16. If it is established in step S16 that the releases or check criteria are met, it is checked in step S60 whether a dew point of the measuring gas is exceeded. For example, it is checked whether the dew point end is met. If the dew point of the measuring gas is exceeded, the interrupted measuring phase is continued in step S62. If the dew point of the measuring gas is not exceeded, it is checked in step S64 whether a value for a current and/or voltage measurement exceeds the threshold value. If the value for a current and/or voltage measurement exceeds the threshold value, for example if condensate stream I is greater than a maximum permitted stream Imax, sensor element 12 is heated after the predetermined debounce time upon a shortfall of the predetermined temperature of sensor element 12. For example, it is checked in step S64 whether a condensate stream I is greater than a maximum permitted stream Imax. If this is not the case, the method returns to step S60, and it is checked again whether the dew point was exceeded. If the value for a current and/or voltage measurement exceeds the threshold value, for example if condensate stream I is greater than a maximum permitted stream Imax, a predetermined debounce time is awaited in step S66. The debouncing is carried out until it is detected in step S68 that the predetermined debounce time has elapsed. If the predetermined debounce time is exceeded, it is checked in step S70 whether a value for a current and/or voltage measurement exceeds the threshold value. For example, it is checked in step S70 whether a condensate stream I is greater than a maximum permitted stream Imax. If this is not the case, the method returns to step S60, and it is checked again whether the dew point was exceeded. In step S72, it is checked whether predetermined heating conditions are met. The heating conditions are release conditions for the heating operation. For example, the sensor element temperature has to exceed a threshold value, and a drop below a maximum heater voltage has to occur.

If it is established in step S72 that the heating conditions are not met, the measuring phase is aborted in step S74. If, in contrast, it is established in step S72 that the heating conditions are met, it is checked in step S76 whether or a maximum overall heating time has already been reached or not. If it is established in step S76 that a maximum duration for the heating has already been reached, the method moves to step S74, and the measuring phase is aborted. If the maximum duration is not reached, sensor element 12 is heated in step S78 upon a shortfall of the dew point of the measuring gas if a value for a current and/or voltage measurement exceeds the threshold value after a predetermined debounce time. In step S80, the heating time of a heating phase is checked, i.e., whether or not the maximum duration of a heating phase has been reached. If the maximum duration of a heating phase has not been reached, the method returns to step S78, and sensor element 12 continues to be heated. If the maximum duration of a heating phase has been reached in step S80, the method returns to step S60, and it is checked again whether the dew point was exceeded.

In summary, when the sensor current increases drastically prior to the dew point end, a debouncing, including subsequent heating phases, has to be run through in the control logic, directly after the ignition has been switched on again, to avoid FALSE FAIL identifications at a measuring start prior to the dew point end, when a sensor regeneration was carried out in the control unit overrun. A debounce time is started in the process when a high sensor current occurs prior to the dew point end. The sensor current is monitored during this debounce time. If it drops back to a normal level, the measuring phase is continued. However, if the high current level remains present beyond the debounce time, the sensor element is heated. After a minimum heating time, the heating of sensor element 12 is ended, and measuring continues without heating. If the heating time thus carried out overall exceeds a limit, the measuring phase of sensor 10 is aborted. During the further course of the driving cycle, a new measuring phase including a sensor regeneration may then be prepared if a dew point end is present.

If all check criteria for continuing an interrupted measuring phase identified as continuable upon switch-on of the internal combustion engine are thus met, sensor 10 may transition directly into the measuring phase again with the aid of the control logic shown in FIG. 4, potentially also without a dew point end. If not all criteria are met, a sensor regeneration has to be started with a subsequent new measuring phase.

If the continuation of the present measuring phase is not considered useful when shutting off the vehicle, a sensor regeneration takes place in the overrun of the control unit. Thereafter, the sensor is switched off. In this way, it is possible during the start of the next driving cycle to dispense with the sensor regeneration, to be able to start the subsequent measuring phase sooner. Upon the start of the next driving cycle, it is checked whether the measuring phase may be started immediately. If not all check criteria are met, a sensor regeneration has to be carried out with a subsequent new measuring phase.

The method according to the present invention may also be substantiated by measuring the sensor housing temperature since, with this operating strategy, potentially a sensor regeneration is carried out in the overrun of the control unit. If an increase in the sensor housing temperature is measurable in the control unit overrun in isolated instances, the present invention is utilized. The present invention may also be substantiated with the aid of testers. During a warm start, a particulate filter on-board diagnosis result is displayed in the tester in the present driving cycle in the process, without prior sensor regeneration.

What is claimed is:

1. A method for operating a sensor for detecting particles in a measuring gas, the sensor including a sensor element, the sensor element including a substrate, at least one first electrode and at least one second electrode, the first electrode and the second electrode being situated on the substrate, the method comprising:

carrying out, by the first electrode and the second electrode, a current and/or voltage measurement in temporally spaced measuring phases;

checking, at least during an interruption of a measuring phase of the measuring phases, whether the interrupted measuring phase is continuable;

identifying the interrupted measuring phase as continuable and subsequently switching off the sensor when, after an expected trigger time, a value for a current and/or voltage measurement drops below a threshold value; and carrying out a regeneration of the sensor element for removing particles from the sensor element and subsequently switching off the sensor when the value for the current and/or voltage measurement exceeds the threshold value.

2. The method as recited in claim 1, wherein the particles are soot particles.

3. The method as recited in claim 1, wherein the measuring gas is exhaust gas of an internal combustion engine, wherein the measuring phase identified as continuable is continued when predetermined check criteria are met upon switch-on of the internal combustion engine, and a regeneration of the sensor element for removing particles from the sensor element is carried out when at least one of the predetermined check criteria is not met upon switch-on of the internal combustion engine.

4. The method as recited in claim 3, wherein the predetermined check criteria include at least an exceedance of a dew point of the measuring gas, a shortfall of a predetermined time period between switch-off and subsequently switch-on of the internal combustion engine, and an exceedance of a predetermined temperature of the sensor element.

5. The method as recited in claim 4, wherein the sensor element is heated when the predetermined temperature of the sensor element falls short.

6. The method as recited in claim 5, wherein the sensor element is heated upon a shortfall of the predetermined temperature of the sensor element when a value for the current and/or voltage measurement exceeds the threshold value after a predetermined debounce time.

7. The method as recited in claim 4, wherein the sensor element is heated when the dew point of the measuring gas falls short.

8. The method as recited in claim 7, wherein the sensor element is heated upon a shortfall of the dew point of the measuring gas when the value for the current and/or voltage measurement exceeds the threshold value after a predetermined debounce time.

9. The method as recited in claim 8, wherein the measuring phase is continued if a value for a current and/or voltage measurement falls below the threshold value after the predetermined debounce time.

10. The method as recited in claim 7, wherein the sensor element is heated until a predetermined maximum duration has been reached, and the measuring phase is aborted when the maximum duration is reached.

11. The method as recited in claim 3, wherein the check criteria furthermore include a shortfall of a predetermined switch-off time of the internal combustion engine, and/or a shortfall of a predetermined accumulated switch-off time of the internal combustion engine and/or an exceedance of a temperature threshold value for a temperature of the sensor element and an exhaust gas temperature upon a renewed switch-on of the internal combustion engine.

12. The method as recited in claim 1, wherein the measuring gas is exhaust gas of an internal combustion engine, a measuring phase being started after the regeneration and upon a switch-on of the internal combustion engine when predetermined check criteria are met.

13. A non-transitory electronic storage medium on which is stored a computer program for operating a sensor for detecting particles in a measuring gas, the sensor including a sensor element, the sensor element including a substrate, at least one first electrode and at least one second electrode, the first electrode and the second electrode being situated on the substrate, the computer program, when executed by a computer, causing the computer to perform:

carrying out, by the first electrode and the second electrode, a current and/or voltage measurement in temporally spaced measuring phases;

checking, at least during an interruption of a measuring phase of the measuring phases, whether the interrupted measuring phase is continuable;

identifying the interrupted measuring phase as continuable and subsequently switching off the sensor when, after an expected trigger time, a value for a current and/or voltage measurement drops below a threshold value; and carrying out a regeneration of the sensor element for removing particles from the sensor element and subsequently switching off the sensor when the value for the current and/or voltage measurement exceeds the threshold value.

14. An electronic control unit which includes a non-transitory electronic storage medium on which is stored a computer program for operating a sensor for detecting particles in a measuring gas, the sensor including a sensor element, the sensor element including a substrate, at least one first electrode and at least one second electrode, the first electrode and the second electrode being situated on the substrate, the computer program, when executed by the electronic control unit, causing the electronic control unit to perform:

carrying out, by the first electrode and the second electrode, a current and/or voltage measurement in temporally spaced measuring phases;

checking, at least during an interruption of a measuring phase of the measuring phases, whether the interrupted measuring phase is continuable;

identifying the interrupted measuring phase as continuable and subsequently switching off the sensor when, after an expected trigger time, a value for a current and/or voltage measurement drops below a threshold value; and carrying out a regeneration of the sensor element for removing particles from the sensor element and subsequently switching off the sensor when the value for the current and/or voltage measurement exceeds the threshold value.

\* \* \* \* \*